United States Patent Office 3,083,277
Patented Mar. 26, 1963

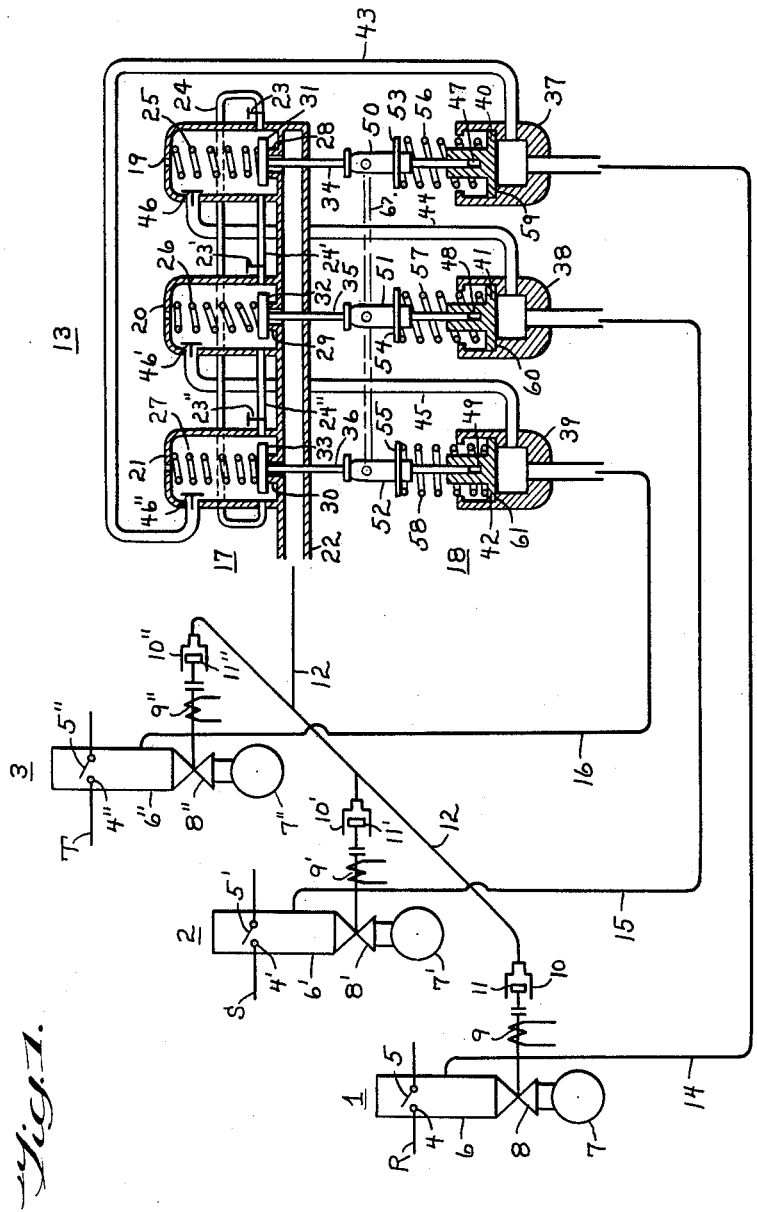

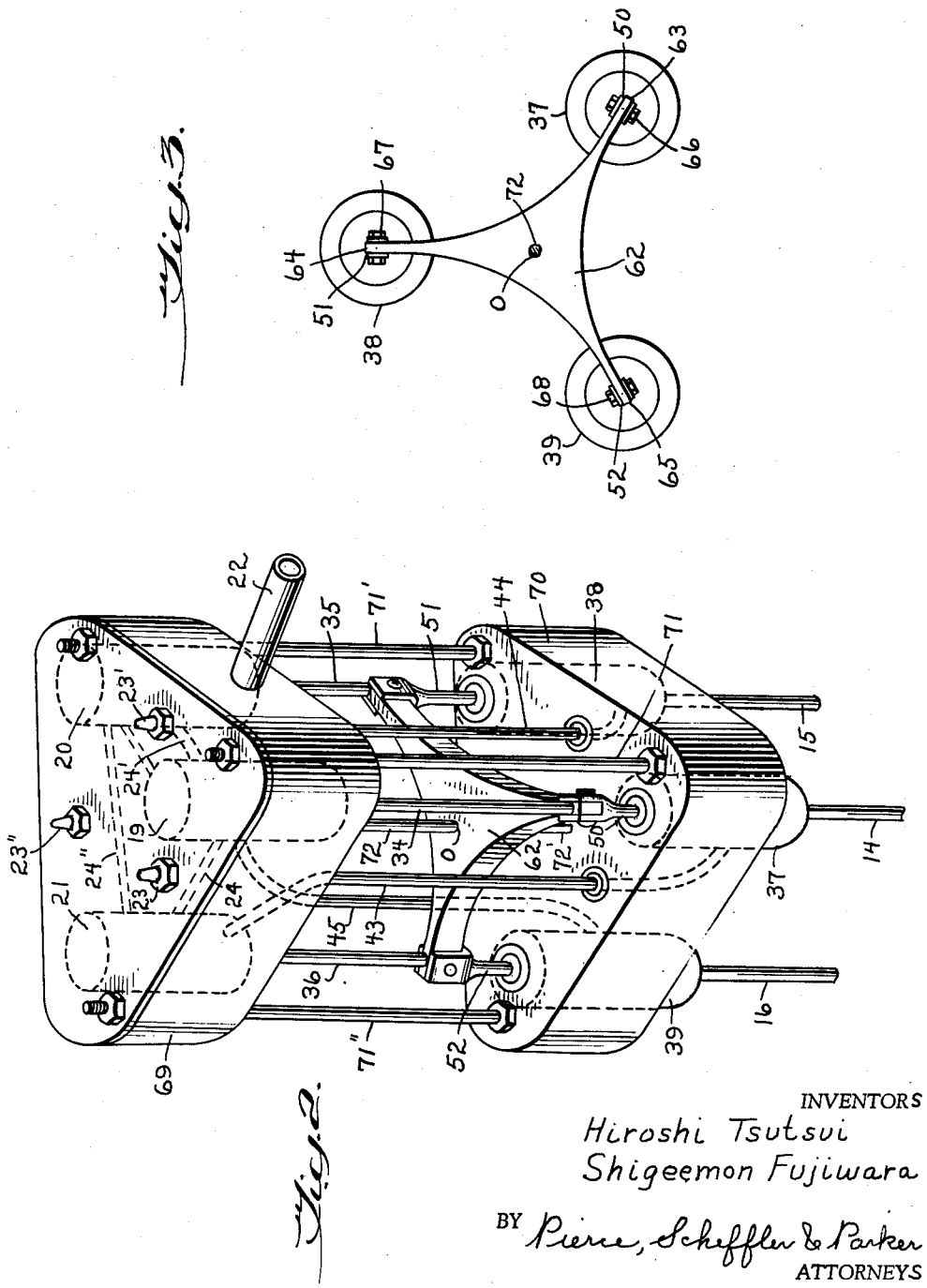

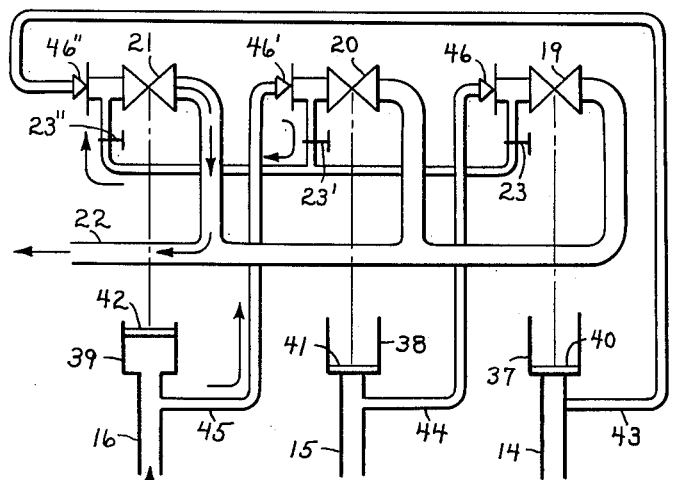
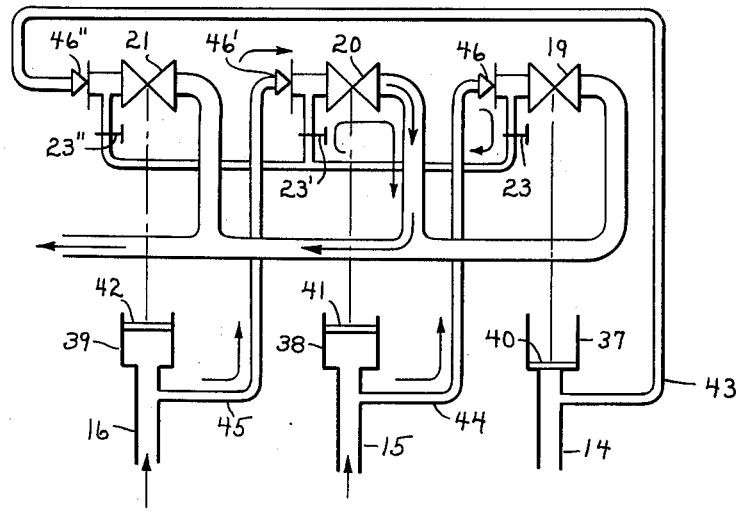

3,083,277
PHASE ABSENCE PROTECTIVE DEVICE FOR POLYPHASE CIRCUIT BREAKERS
Hiroshi Tsutsui and Shigeemon Fujiwara, Yokohama, Japan, assignors by mesne assignments, to Tokyo Shibaura Electric Co., Ltd., Kawasaki, Japan, a corporation of Japan
Filed July 15, 1960, Ser. No. 43,049
Claims priority, application Japan July 15, 1959
3 Claims. (Cl. 200—82)

This invention relates to a phase absence protective device for polyphase circuit breakers, and more particularly to an improved phase absence protective device for polyphase air circuit breakers of the type to be independently opened and closed by individual operating mechanisms. Referring to a three phase electric power system, for example, the most frequently occurring faults among those occurring in such systems are single phase ground faults which amount to 60 percent of the entire faults, and next frequent faults are two phase ground and short circuit faults which amount to 40 percent of the entire faults whereas three phase simultaneous ground and short circuit faults are only about 1 percent of the entire faults. Among said faults, those occurring less frequently such as two phase ground and short circuit faults, three phase simultaneous ground and short circuit faults and the like, must be promptly cleared by interrupting simultaneously all phases, whereas the single phase line ground faults which occur most frequently are desired to be cleared without interrupting the system service by opening only both terminal circuit breakers included in the grounded phase and then reclosing them after a suitable deionizing time has elapsed. Accordingly, since circuit breakers utilized in relatively large electric power systems are required to effect single phase reclosing, the circuit breaker for each phase is provided with an individual operating mechanism so that it can be operated independently. With circuit breakers of such construction, when it is attempted to open and close simultaneously the three phases in a case when one of the mechanisms is out of order, one phase may be in opened while the other phase may be in closed condition since they are operated by separate mechanisms. Such condition will be referred to "phase absence" in the following description. Excepting the single phase reclosing operation at the time of single phase ground fault where a particular phase is interrupted, phase absence of the system is very undesirable from the standpoint of stability and hence it is necessary to provide a suitable protective means effective to interrupt all phases as fast as possible upon occurrence of the phase absence. In prior circuit breakers of this type, auxiliary contacts which are arranged to be closed or opened in the same manner as the main contacts are interconnected such that when phase absence occurs, trip coils of the circuit breakers belonging to the respective phases are energized through this interphase connection to effect interruption of all phases.

Certain air circuit breakers now being used are of such mechanical construction that they are difficult to equip with auxiliary contacts which are directly associated with the main contacts. Therefore, circuit breakers of this type are provided with special pneumatic phase absence detecting devices which are so arranged that, when operated, simultaneously send tripping air serving as the circuit interruption commanding signal to the trip valve mechanism of each circuit breaker. For effecting phase absence protection, the following considerations are required. Single phase reclosing for single phase ground inherently accompanies phase absence operation and since operation of the phase absence protective device to effect interruption of all phases would result in unsuccessful reclosing it is necessary to construct the phase absence protective device such that it will operate with a certain time delay when effecting single phase reclosing. While this time delay is determined dependent upon such factors as the magnitude of the system, the time required for effecting reclosing operation of the circuit breaker, type of the carrier wave relaying device used, deionizing time at the grounded point and the like, it is usually selected to about one second and the protective system is arranged in such a manner as to interrupt all phases by the action of the phase absence protective device in case when reclosing is not completed even after this time interval has elapsed. When it is desired to interrupt all phases owing to a short circuit fault or when only two phases are interrupted and one phase remains closed owing to any other fault, it is necessary to cause the phase absence protective device to promptly operate to interrupt as far as possible all phases. This is particularly true in electric power systems which are grounded through reactors or resistors wherein step out condition would result in producing abnormal high voltage whereby to threaten the insulation of electric machines and devices in the system. However, since prior phase absence protective devices are so designed that to operate after a predetermined time delay for any type of phase absence there was such disadvantage that the phase absence condition would continue during said time delay period even with such phase absence condition as two phase interrupted and one phase closed where immediate interruption of all phases is important.

The object of this invention is to provide a phase absence protective device for polyphase circuit breakers where the circuit breaker is opened with a predetermined time delay for single phase reclosing whereas circuit breakers of all phases are opened instantly upon such fault as requires interruption of all phases and subsequent reclosing of one phase.

For attaining the above mentioned object, the phase absence protective device of this invention comprises a circuit breaker in each phase of a polyphase electric power circuit, each of said circuit breakers including a trip mechanism utilizing pressurized fluid and a pair of relatively movable contacts and operable independently; air cylinder means of a number equal to that of the circuit breakers, each of said cylinder means being responsive to pressurized fluid utilized at the time of operation of the circuit breaker belonging to each phase, valve devices of the number corresponding to the number of circuit breakers and each having an air chamber and a valve in said air chamber adapted to be operated by said air cylinder means, each of said air chambers being arranged to receive pressurized air from said air cylinder means associated with the circuit breaker in an adjacent phase, said air chambers being connected through a throttle valve and an operating air cylinder means associated with the trip mechanism of said circuit breaker of each phase, said operating air cylinder means being in communication with the valve port of said valve device to receive pressurized fluid from said air chamber to effect simultaneous opening of the circuit breakers of all phases.

In the accompanying drawings:

FIG. 1 is a diagrammatic view of an arrangement illustrating one embodiment of a phase absence protective device for polyphase circuit breakers embodying this invention;

FIG. 2 is a perspective view of a valve device utilized in the device shown in FIG. 1;

FIG. 3 is a plan view of a balancing means utilized in the valve device shown in FIG. 2, and FIGS. 4a and 4b are diagrammatic views, respectively, showing different operating conditions of the phase absence protective device according to this invention.

Referring to the accompanying drawings illustrating one embodiment of this invention, a three phase electric power circuit is designated by R, S and T in FIG. 1. In each phase of the three phase circuit there is provided one of the circuit breakers 1, 2 and 3 of the same type. Each circuit breaker comprises a pair of relatively movably contacts 4, 5; 4', 5' and 4", 5" respectively, an interrupting chamber 6, 6' and 6" respectively, each containing one of these pairs of contacts, an air reservoir tank 7, 7' and 7", respectively, which serves to store compressed air and also to act as a supporting base, and an air blast valve 8, 8' and 8", respectively, of the triple valve type, each acting to supply compressed air to the interrupting chamber from said air reservoir tank or to exhaust the compressed air in said interrupting chamber. As is well known, when air blast valves 8, 8' and 8" are opened to introduce compressed air into the interrupting chambers from air reservoir tanks 7, 7' and 7", one of the contacts, for example 5, 5' and 5" is separated from the other contact 4, 4' and 4", respectively, under the action of the compressed air and while the contacts are separating, a large quantity of compressed air is blasted across the contacts whereby to cool the electric arc and at the same time to expel ionized ions into the surrounding air. When the arc is extinguished to interrupt the circuit in this manner, contacts 5, 5' and 5" respectively close a part communicating to the atmosphere at their limit position of movement whereupon the interior of each interrupting chamber is charged with compressed air having high dielectric strength to effectively insulate the separated contacts. When the valves 8, 8' and 8" are operated to interrupt the passages from the air reservoir tanks 7, 7' and 7" to the interrupting chambers 6, 6' and 6", respectively, and to discharge air in the interrupting chambers into the atmosphere, contacts 5, 5' and 5" are promptly moved in circuit closing direction under the action of a spring, not shown, whereby to engage with the other contacts 4, 4' and 4", respectively, to close the electric power circuit.

In order to control the blast valves 8, 8' and 8" in a manner as above described, there are provided electromagnetic operating trip coils 9, 9' and 9". Although not shown in the drawing these coils are connected so as to be selectively or simultaneously controlled by a control relay responsive to single phase reclosing signal or a control relay responsive to polyphase fault removing signal. In the illustrated embodiment, these coils are so arranged as to impart their electromagnetic force to the operating rods of valves 8, 8' and 8" in such a manner that, when the coils are energized, compressed air is supplied to the interrupting chambers 6, 6' and 6" from the air reservoir tank 7, 7' and 7" to effect circuit interruption and that when the coils are deenergized, the air supply is interrupted and the compressed air in the interrupting chambers is exhausted whereby to close the contacts.

Operating air cylinders 10, 10' and 10" each responsive to air pressure are provided in order to purely mechanically control said valves 8, 8' and 8" instead of using electro-magnetic force produced by the trip coils 9, 9' and 9" and pistons 11, 11' and 11" are respectively mechanically associated with the operating rods of the valves 8, 8' and 8". When the air pressure in said cylinders is removed, pistons 11, 11' and 11" and valves 8, 8' and 8" will return to the original position to exhaust the pressure air in the interrupting chambers 6, 6' and 6" whereby to close the contacts. Since the pneumatic control effected by the operating cylinders 10, 10' and 10" is primarily used in emergencies such as in case of a fault of trip coils 9, 9' and 9" and their associated circuits and further since in such case it is normally required to interrupt all phases, it is arranged such that all of the cylinders 10, 10' and 10" are simultaneously supplied with compressed air through a common pipe line 12.

In order to increase the air pressure in said pipe line 12 to the required operating pressure for valves 8, 8' and 8" with a suitable time delay, for example, about one second in case of single phase reclosing, and further to rapidly increase said air pressure in the pipe line 12 to said operating pressure for effecting instant interruption of all phases upon occurrence of phase absence such as two phases interrupting and one phase reclosing, there is provided a phase absence protective device 13. This device is provided between the common pipe line 12 leading to the operating cylinders 10, 10' and 10" of the phase circuit breakers 1, 2 and 3, and pipe lines 14, 15 and 16 each communicating respectively with one of the interrupting chambers 6, 6' and 6" of phase circuit breakers 1, 2 and 3 for supplying the compressed air in said interrupting chambers to the pipe line 12 and comprises a valve mechanism 17 adapted to operate to interrupt, throttle or fully open the communication between said pipe line 12 and pipe lines 14, 15 and 16, and a cylinder mechanism 18 adapted to open and close said valve mechanism in response to the air pressure in interrupting chambers 6, 6' and 6" of the respective phase circuit breakers 1, 2 and 3. Said valve mechanism 17 also includes three air chambers 19, 20 and 21 arranged to receive the compressed air in the interrupting chambers 6, 6' and 6" of the respective phase circuit breakers 1, 2 and 3, the lower portion of each air chamber being connected through a valve 2a common pipe line 22 leading to the pipe line 12 and the said lower air chamber portions being interconnected through pipe lines 24, 24' and 24" each provided therein with a throttle valve 23, 23' and 23". In each of said air chambers 19, 20 and 21 there is provided a valve plate 31, 32 and 33, each urged by a spring 25, 26 and 27 against valve port 28, 29 and 30, said valves being constructed to be opened and closed by the cylinder mechanism 18 through valve stems 34, 35 and 36, respectively, as will be explained hereinafter. The cylinder mechanism 18 which controls the respective valve plates 31, 32 and 33 of the valve mechanism 17 comprises three cylinders 37, 38 and 39 adapted to respectively receive the compressed air in the interrupting chambers 6, 6' and 6" through pipe lines 14, 15 and 16, respectively, and pistons 40, 41 and 42 respectively arranged to freely slide in each of said cylinders. The cylinder 37 is connected with the air chamber 21 of the valve mechanism 17 through a pipe 43, the cylinder 38 with the air chamber 19 through a pipe 44 and the cylinder 39 with the air chamber 20 through a pipe 45. At the ports opening into the respective air chambers 19, 20 and 21 there are provided check valves 46, 46' and 46" which act to check the flow of air towards the pipe from inside the air chamber. Each piston 40, 41 and 42 slidably disposed in each of the cylinders 37, 38 and 39 is provided with a slot 47, 48 and 49 each receiving a piston rod 50, 51 and 52. The upper ends of the piston rods are engaged with the lower surfaces of the valve rods 34, 35 and 36 of the valve mechanism 17. Springs 56, 57 and 58 are interposed respectively between upper flanges 53, 54 and 55 and pistons 40, 41 and 42 to normally urge the respective piston to seat upon respective shoulders 59, 60 and 61 provided in the cylinders 37, 38 and 39, respectively, above the ports of pipes 43, 44 and 45.

In the phase absence protective device 13 wherein the valve mechanism 17 and the cylinder mechanism 18 are associated as above explained, as the air in each of the interrupting chambers 6, 6' and 6" of the respective phase circuit breakers 1, 2 and 3 is supplied simultaneously through respective pipe lines 14, 15 and 16 to the respective air cylinders 37, 38 and 39 of the cylinder mechanism 18 upon three phase simultaneous interruption pistons 40, 41 and 42 will move simultaneously upwardly whereby to simultaneously open valves 31, 32 and 33 of the valve mechanism 17 to supply the compressed air in the air chambers supplied thereto through pipes 43, 44 and 45, respectively, to the operating cylinders 10, 10' and 10" of the respective circuit breakers 1, 2 and 3 through the common pipe 22 and pipe line 12. When three phases are successfully interrupted simultaneously said air supply is not necessary but rather wasteful. In this embodiment, in order to eliminate such unnecessary air supply in case of three phase simultaneous interruption, a balancing device 62 is associated with the cylinder mechanism 18. As shown in FIG. 3 this balancing device 62 is of an isosceles triangular shape with its centre of gravity O supported from upper and lower sides to freely tilt therearound. Each of the apexes 63, 64 and 65 of the triangle is pivotally connected to the upper end of each of the piston rods 50, 51 and 52 of the cylinder mechanism 18 through clamping means 66, 67 and 68, respectively. Accordingly if balanced forces are simultaneously applied to the apexes 63, 64 and 65 of said balancing device 62, it would not be tilted but if the force is applied to only one apex 63 or two apexes 63 and 64, for example, piston rods 51, 52 or 52, connected to the remaining apexes 64, 65 or apex 65 would be urged to slide downwardly against the springs 57, 58 or spring 58 to tilt the balancing device 62 around the center of gravity O.

While in the above descriptions construction of the valve mechanism 17 and cylinder mechanism 18 comprising the phase absence protective device 13, has been described schematically in practice these mechanisms are formed as a unitary structure as shown in FIG. 2. Thus, air chambers 19, 20 and 21 of the valve mechanism 17 are contained in a single casing 69 and the common pipe 22 and pipes 24, 24' and 24" are also arranged in said casing. Throttle valves 23, 23' and 23" are provided on the upper surface, the valve rods 34, 35 and 36 on the lower surface and the end of the common pipe 22 adapted to be connected with the pipe line 13 on the side surface of said casing. Also, cylinders 37, 38 and 39 of the cylinder mechanism 18 are contained in a single casing 70 and piston rods 50, 51 and 52 of the respective cylinders 37, 38 and 39 are provided on the upper surface while the connecting ends of the respective cylinders 37, 38 and 39 are adapted to be connected with pipe lines 14, 15 and 16 on the lower surface of the casings 70. Casing 69 and 70 constructed as above explained are connected to form a unitary structure with a suitable space therebetween by connecting rods 71, 71' and 71" and the balancing device 62 is mounted in the space between said two casings with its center of gravity supported so as to tilt freely by means of supporting rods 72 and 72' having opposite ends fixed respectively to the lower surface of the casing 69 and the upper surface of the casing 70. As has been pointed out above to each of the apexes 63, 64 and 65 of said balancing device 62, is pivotally connected each of the piston rods 50, 51 and 52 of the cylinder mechanism and the lower end of each of the valve rods 34, 35 and 36 engages the upper surface of the balancing device. Pipes 43, 44 and 45 interconnecting respectively the air chambers 19, 20 and 21 of the valve mechanism 17 with the air cylinders 37, 38 and 39 of the cylinder mechanism 18 are arranged in the space between casings 69 and 70 to minimize the size of the phase absence protective device 13.

Having completed the description of the various constructional elements, operation thereof will now be explained. When all phase circuit breakers are in the closed position, the interior of each interrupting chamber 6, 6' and 6" is exhausted and no air pressure is present in the air cylinders 37, 38 and 39 of the phase absence protective device 13 so that pistons 40, 41 and 42 are urged against their respective valve seats 59, 60 and 61 whereby all of the valves 31, 32 and 33 of valve mechanism 17 are in closed position to interrupt supply of air to the operating cylinders 10, 10' and 10".

Now, three phase simultaneous interruption under normal conditions will be described. This interruption is effected by simultaneously sending a tripping signal to the tripping coils of all phase circuit breakers 1, 2 and 3 to actuate blast valves 8, 8' and 8" thus supplying compressed air in the air reservoir tanks 7, 7' and 7" to the interrupting chambers. Concurrently with this interrupting operation, air in the contact interrupting chambers 6, 6' and 6" is introduced into cylinders 37, 38 and 39 within cylinder mechanism 18 of the phase absence protective device 13 to effect simultaneous operation of the pistons 40, 41 and 42 but, as the movement of piston rods 50, 51 and 52 is prevented by the balancing device 62, the valve mechanism 17 would not be actuated. Therefore the air path between pipe lines 14, 15 and 16 and the pipe line 22 is interrupted to prevent supply of compressed air to the operating cylinders 10, 10' and 10". Thus, in case of normal three phase simultaneous interruption, air is not supplied to cylinders 10, 10' and 10" from the phase absence protective device 13.

Next, explanation will be given in relation to opening of one phase only of the three phase circuit, for example, the circuit breaker 3 belonging to phase T, in order to effect single phase reclosing. This single phase opening is effected by supplying a tripping signal only to the trip coil 9". When circuit breaker 3 is opened, compressed air in the interrupting chamber 6" will enter into the space beneath the piston 42 of the cylinder 39 through the pipe line 16 to elevate said piston 42 together with its piston rod 52. In this case, as the apex 65 only of the balancing device 62 is subjected to raising force, piston rods 50 and 51 connected with other apexes 63 and 64 would be forced to move downwardly in slots 47 and 48. Accordingly the valve 33 of the valve mechanism 17 will be raised by the rod 52 and thereby opened. On the other hand compressed air in the cylinder 39 will be introduced into the air chamber 20 through the pipe 45, and the compressed air in this air chamber 20 will be forced into adjacent air chamber 21 through the pipe 24" and thence through now opened valve 33 into the common pipe 22 and supplied to each of the operating cylinders 10, 10' and 10" through pipe lines 22 and 12. Intermediate of the pipe 24" there is provided a throttle valve 23" to restrict the air flow so that it takes some time for the pressure in the pipe 12 to reach a value sufficient to operate pistons in the operating cylinders 10, 10' and 10". This time delay can be adjusted by means of the throttle valve 23" and it is so determined that single phase reclosing of circuit breaker 3 is completed during this time delay. The time delay is usually determined to about one second. Reclosing is effected by deenergizing the trip coil 9", thus closing passage of compressed air from air reservoir tank 7" to the interrupting chamber 6" whereby to exhaust the compressed air in the interrupting chamber 6". When this reclosing operation is successfully completed, the pressure in the cylinder 39 will also be decreased so that the piston 42 and valve 33 will be returned to the original position shown in FIG. 1 under the bias of the springs 58 and 27.

However when the single phase reclosing is unsuccesful, thus it is not completed within said time limit after said time limit has elapsed, the pressure in operating cylinders 10, 10' and 10" will reach a pressure sufficient to operate valves 8, 8' and 8" whereby valves 8 and 8' belonging to closed circuit breakers 2 and 1 will operate to send compressed air from their air reservoirs to their respective interrupting chambers 6 and 6' thus causing simultaneous interruption of both of the circuit breakers 1 and 2 to effect interruption of all phases.

Now considering two phase absence such as two phase interrupted and one phase closed which may be caused by failure of the energizing circuit of coils 9, 9' and 9" when it is intended to effect three phase simultaneous closing and simultaneous interruption. For convenience it is assumed that circuit breakers 2 and 3 belonging to phases S and T are interrupted and only circuit breaker 1 of phase R is closed. Upon occurrence of such two phase absence the system would become out of step to produce abnormal voltage in the system which threatens insulation of the line and of the machines and apparatus connected therewith. Therefore when such fault occurs it is necessary to promptly interrupt the circuit breaker 1 of the remaining phase R to interrupt all phases. Where two phases are absent as above, since the interior of cylinders 38 and 39 of the phase absence protective device 13 are placed in communication with the interrupting chambers 6' and 6", respectively, the compressed air will act upon pistons 41 and 42 in cylinders 38 and 39 whereas it will not act upon piston 40 in the cylinder 37. Accordingly, only apexes 64 and 65 of the balancing device 62 will receive a raising force caused by piston rods 51 and 52 while remaining apex 63 will be forced downwardly to lower the piston rod 50 in the slot 47 thus tilting the balancing device 62 around its center of gravity O. This tilting motion of the balancing device 62 will cause piston rods 51 and 52 to open valves 32 and 33 of the valve device 17.

Simultaneously with this operation of valves, compressed air in the interrupting chambers 6' and 6" of circuit breakers 2 and 3 belonging to phases S and T is introduced into air chambers 19 and 20 of the valve device 17 through pipe lines 15 and 16 and pipes 44 and 45. As the valve 31 is closed, the compressed air in the air chamber 19 will not be supplied to the common pipe 22 and compressed air in the air chamber 20 alone will be immediately supplied to the common pipe 22 through the opening in the valve 32 and thence to the operating cylinders 10, 10' and 10" of all phase circuit breakers through pipe lines 22 and 12. Thus the blast valve 8 of the circuit breaker 1 belonging to phase R which is now closed is opened instantly by the operation of the operating cylinder 10 whereby to supply compressed air in the air reservoir tank 7 to the interrupting chamber 6 for disengaging contact 5 from contact 4. Thus in case of two phase absence and one phase closed, the remaining one phase is promptly interrupted to prevent generation of abnormal voltage.

As will be clearly understood from foregoing descriptions this invention provides a purely mechanical phase absence protective device which can effect a positive protective function and which can accurately detect a phase absence fault caused by troubles in the trip coils and their circuits so as to effect circuit interruption with a time delay in case of single phase reclosing and instantaneous interruption of all phases at the time of two phase absence and the like.

We claim:

1. A polyphase compressed gas operated circuit breaker apparatus and a phase absence protective device combined therewith comprising a plurality of phase circuit breakers having their contacts connectable in the respective phases to be switched and the contacts of each said phase circuit breaker being enclosed within an interrupting chamber and being actuated to open position upon introduction of compressed gas into the chamber, a blast valve individual to each said phase circuit breaker for controlling admission of compressed gas into the corresponding interrupting chamber, first compressed gas operated piston and cylinder assemblies individual to said phase circuit breakers for actuating the corresponding blast valves, second compressed gas operated piston and cylinder assemblies individual to said phase circuit breakers and which are actuated respectively by compressed gas when introduced into the interrupting chambers thereof, valve devices individual to said second piston and cylinder assemblies, each said valve device including a gas chamber and a valve member controlling an outlet port therefrom, each said valve member being operatively connected to the corresponding one of said second piston and cylinder assemblies, conduit means interconnecting each said gas chamber with the cylinder element of a second piston and cylinder assembly belonging to the circuit breaker of an adjacent phase, throttle valve controlled conduits interconnecting all of said air chambers, and conduit means connecting the outlet ports of said gas chambers with said first piston and cylinder assemblies.

2. A polyphase compressed gas operated circuit breaker apparatus and phase absence protective device combined therewith as defined in claim 1 and which further includes a balancing device located in the connections between said second piston and cylinder assemblies and the valve members correlated therewith and which serves to prevent operation of all of said second piston and cylinder assemblies and thereby maintain all of said outlet ports in a closed position when all of said phase circuit breakers are operated simultaneously to open their respective contacts.

3. A polyphase compressed gas operated circuit breaker apparatus and phase absence protective device combined therewith as defined in claim 2 wherein said balancing device is comprised of a plate mounted for tilting movement about its center and having three control points thereon corresponding to the apices of an isosceles triangle, said control points being located in the connections between said second piston and cylinder assemblies and the valve members correlated therewith.

References Cited in the file of this patent
UNITED STATES PATENTS
2,673,271    Amer _____ Mar. 23, 1954